United States Patent [19]

Irino

[11] Patent Number: 4,682,357
[45] Date of Patent: Jul. 21, 1987

[54] AUTOMOBILE TELEPHONE APPARATUS
[75] Inventor: Etsuro Irino, Amagasaki, Japan
[73] Assignee: Mitsubishi Denki Kabushiki Kaisha, Tokyo, Japan
[21] Appl. No.: 697,501
[22] Filed: Jan. 31, 1985
[30] Foreign Application Priority Data Feb. 16, 1984 [JP] Japan .............................. 59-21507[U]

[51] Int. Cl.⁴ .......................................... H04M 1/274
[52] U.S. Cl. ...................................... 379/356; 379/58
[58] Field of Search ................. 179/2 EB, 90 B, 90 D
[56] References Cited

U.S. PATENT DOCUMENTS 4,220,820 9/1980 Mallien, II ......................... 79/2 EB
4,453,040 6/1984 Wolf et al. ......................... 179/81 C Primary Examiner—Robert Lev
Attorney, Agent, or Firm—Lowe Price LeBlanc Becker & Shur

[57] ABSTRACT

An automobile telephone apparatus comprising a CPU memory means for repertory dialing, and sound producing means to provide audible feedback to the user. The device emits a tone pulse each time a button is activated. Upon completion of entry of a repertory dialing code, the apparatus searches its memory, and if a corresponding telephone number is found, a final valid tone indicator is emitted and the telephone number is displayed. Alternatively, if no stored telephone number is found, an error tone is sounded. Thus, the user need not divert his attention to the display in order to establish the validity of the inputted code.

4 Claims, 2 Drawing Figures

U.S. Patent   Jul. 21, 1987   4,682,357
FIG.1                              PRIOR ART
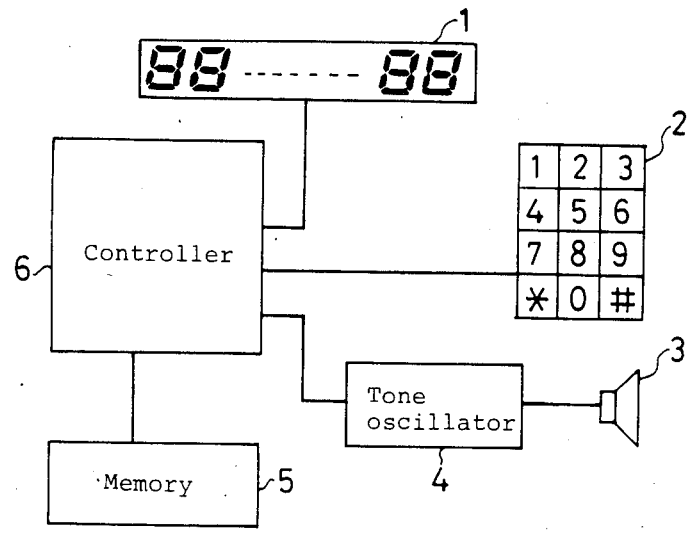
FIG.2
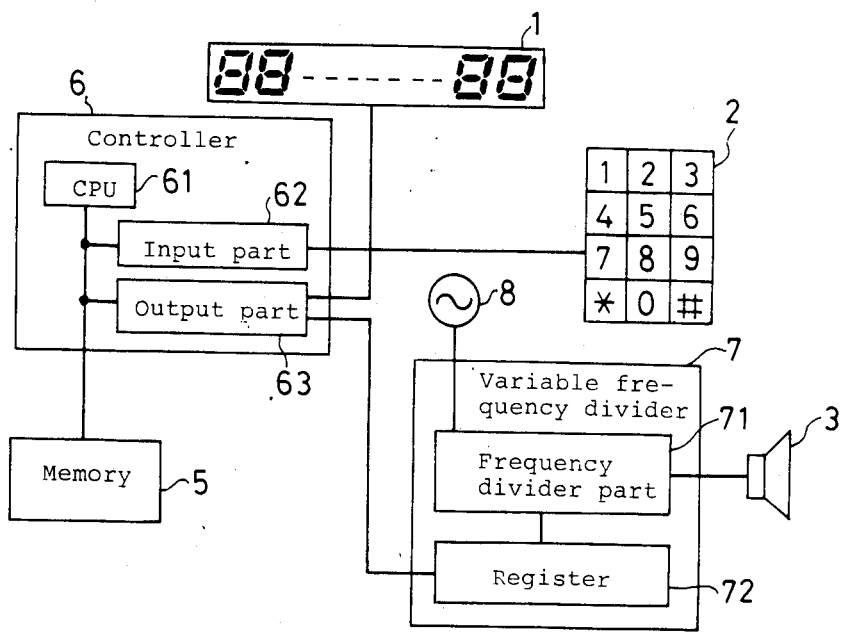

AUTOMOBILE TELEPHONE APPARATUS

BACKGROUND OF THE INVENTION

1. Field of the Invention

The present invention relates generally to an improvement in an automobile telephone apparatus, and particularly concerns an automobile telephone apparatus having repertory dialing function.

2. Description of the Prior Art:

The conventional automobile telephone apparatus has been configured as shown in FIG. 1, wherein the automobile telephone apparatus comprises a display 1 for displaying telephone number selected, a keyboard 2 having keys of numbers 0 through 9 and function keys for inputting the desired telephone number or repertory dialing code, a speaker 3 to generate tones corresponding to the depression of the audible keys of keyboard 2, a tone signal oscillator 4 for generating tones to be issued from the speaker 3, a memory 5 for storing coded telephone numbers and a controller 6 for controlling the above-mentioned parts.

The operation of the above-mentioned conventional automobile telephone apparatus is as follows. When the user of the automobile telephone apparatus wishes to check to see whether or not a repertory dialing code has been stored in the memory 5, the repertory dialing code is inputted by pushing corresponding keys of, for instance, $X_1$, $X_2$, and #, wherein $X_1$ and $X_2$ represent certain digits and # is a function key. The controller 6 then transmits the inputted repertory dialing code as an address to the memory 5. At the same time, the controller 6 activates the tone oscillator 4, producing tone signals corresponding to each depression of the keys. The tone signals are then made audible by the speacker 3. Therefore, the speaker 3 generates tones for each pushing of the keys of the keyboard 2. When a telephone number corresponding to the repertory dialing code input has been previously stored in the memory 5, the controller 6 causes the memory 5 to issue signals for a full telephone number and causes the display to display the full telephone number. Alternatively, when a repertory dialing code as input from the keyboard 2 has not been previously stored in the memory 5, the memory does not issue any telephone number, and hence, the display 1 does not display any number. That is, while depressing the keys of keyboard 2, the user hears the same tones for both situations wherein the repertory dialing code is stored in the memory 5 and wherein the repertory dialing code is not stored in the memory 5. Confirmation that the inputted repertory code is correctly stored in the memory 5 can be accomplished only by watching display 1 whereon the full telephone number is displayed.

Therefore, in the conventional automobile telephone apparatus, the user can check the code as inputted through the keyboard 2 for validity only by watching the display 1 to confirm whether or not the full telephone address is displayed after input of the code through the keyboard. This diversion of the drivers attention and sight to observe the display while driving is very dangerous.

SUMMARY OF THE INVENTION

The purpose of the present invention is to provide an improved automobile telephone apparatus, wherein the above-mentioned drawback has been eliminated. That is, the automobile telephone apparatus in accordance with the present invention provides means to confirm whether or not the repertory dialing code inputted by a user from a keyboard is prestored in the memory by means of different modes of tone from a speaker. Thereby, the need to divert the driver's attention away from the road to observe a display can be dispensed with.

The automobile telephone apparatus in accordance with the present invention comprises:

a keyboard for inputting a full telephone number or a repertory code for a telephone number, a memory for storing telephone numbers which are accessible by the repertory dialing code number, a controller which generates a first signal when a number inputted from the keyboard is a repertory dialing code for one of the memorized telephone numbers and generates a second signal when the number inputted from the keyboard is not a repertory dialing code for any of the stored telephone numbers, a signal generator which generates a sound signal of a first kind at reception of said first signal and a sound signal of a second kind at reception of said second signal, and a sound generator for generating different audible sounds in response to said sound signals of different kinds.

BRIEF DESCRIPTION OF THE DRAWING

FIG. 1 is the block diagram of the conventional automobile telephone apparatus.

FIG. 2 is a block diagram showing configuration of a preferred embodiment of an automobile telephone apparatus in accordance with the present invention.

DESCRIPTION OF THE PREFERRED EMBODIMENT

A preferred embodiment of the present invention is described with reference to FIG. 2. The embodiment comprises a keyboard 2 for inputting a full telephone number typically consisting of seven digits for telephone dialing within the same area code or ten digits for domestic long distance dialing or thirteen or more digits for international telephone calls. Alternatively, a repertory code number for dialing utilizing a memory 5 may be input, for instance, by using one function key, such as the # or * symbol. The resultant output signal from keyboard 2 is input to controller 6 which comprises a CPU 61, an input means 62 for receiving the output from the keyboard and an output means 63. The output signal from the output means 63 of the controller 6 has two types of signals A and B. The latter signal B is issued only when the control means 6 finds that the code inputted from the keyboard is not stored in the memory 5, and is input to a register 72 of a variable frequency divider 7 as a signal generator. Variable frequency divider 7 has frequency divider means 71 for dividing the frequency of an oscillator 8 in at least two dividing ratios, selection of which is controlled by the state of register 72. The output signal from frequency dividing means 71 is output to speaker 3 as a sound generator, audibly sounding upon each depression of a key. The ratio of the frequency dividing is controlled by the state of the register 72. The apparatus further has a memory 5 for storing telephone numbers which are accessed by the repertory dialing code output by output means 63 upon receipt of a repertory dialing number from keyboard 2, and display 1 comprised of an LED device or liquid crystal device to display the telephone number. Controller 6 is comprised of an IC or an LSI circuit, and furthermore the memory 5, the variable frequency divider 7 and the oscillator 8 may be included as part of the same IC or LSI circuit.

The operation of the above-mentioned embodiment is as follows:

Now, provided that the repertory code number of the form $X_1$, $X_2$, # wherein $X_1$ and $X_2$ represent the digits from 0 to 9 and # is a function key of the automobile telephone, and that the inputted dialing code $X_1$, $X_2$, # is one which is already stored in the memory 5, then when the repertory dialing code is inputted from the keyboard 2 to the input means 62 of controller 6, upon depression of each of the first two keys $X_1$ and $X_2$, CPU 61 of controller 6 issues through output means 63 the first signal A to register 72 of variable frequency divider 7. This also results in oscillator 8 oscillating at a frequency. Frequency divider 71 divides the frequency of the signal of the oscillator 8 to make a first kind sound signal and the divided first kind sound signal is output to speaker 3. Speaker 3 then emits two sounds of the same frequency in sequence. Upon a third activation of the key #, CPU 61 searches memory 5 to determine whether the inputted repertory dialing code of $X_1$, $X_2$, # is stored in the memory 5. When, as a result of the search of the memory, it is determined that the code corresponds to a valid stored telephone number, CPU 61 maintains the same dividing ratio without change in frequency divider means 72. This results in variable frequency divider 7 emitting a third sound of the first kind sound, i.e., a sound of the same frequency as that of the preceding two sounds in sequence.

As described, when the inputted repertory dialing code is found stored in memory 5, the speaker 3 emits a train of three sounds of the same tone which correspond to the first signal A. At this time the full stored telephone number is sent to the telephone exchanger for dialing, and simultaneously the full telephone number is displayed on the display 1.

Nextly, when the inputted repertory dialing code $X_1$, $X_2$, # is not stored in memory 5, then upon receipt of the first two digits $X_1$ and $X_2$ the CPU 61 causes output means 63 to output the first signal A to register 72 of the variable frequency divider 7. The variable frequency divider 7 then outputs a sound signal of the kind causing speaker 3 to emit two sound signals of the first kind in sequence corresponding to the first two activations of the keys $X_1$ and $X_2$. When a third activation of the key # is made, CPU 61 searches memory 5 to determine whether or not the inputted repertory dialing code of $X_1$, $X_2$, # is stored in the memory 5. When, as in this case the search of the memory indicates that the code $X_1$, $X_2$, # is not for a stored telephone number, the CPU changes the dividing ration of frequency divider means 72. Therefore, variable frequency divider 7 outputs a third sound of a second frequency, different from that of the preceding two sounds, and corresponding to the second signal B.

That is, when the inputted repertory dialing code is not stored in memory 5, speaker 3 emits a train of three sounds consisting of two consecutive sounds of first type corresponding to the first signal A and one different sound of the second type corresponding to the second signal B. At this time, no number is displayed on the display 1.

Since the second type tone is selected to be very different in frequency from that of the first type frequency, the user can readily determine that the repertory code as input was invalid. Therefore, the user need not watch display 1, diverting his attention away from the task of driving the automobile.

Though the above-mentioned embodiment is configured for automobile telephone apparatus, the apparatus may be also used as an ordinary telephone apparatus for a fixed station.

What is claimed is:

1. An automobile telephone apparatus comprising:
   a keyboard for inputting a full telephone number or a repertory dialing code for a telephone number,
   a memory for storing telephone numbers which are accessible by said repertory dialing code number,
   a controller which generates a first signal when a number inputted from said keyboard is a repertory dialing code for one of the stored telephone numbers and generates a second signal when the number inputted from said keyboard is not a repertory dialing code for any of said stored telephone numbers,
   a signal generator which generates a sound signal of a first kind at reception of the first signal and a sound signal of a second kind at reception of the second signal, and
   a sound generator for generating different sounds at receptions of the sound signals of different kinds.

2. An automobile telephone apparatus in accordance with claim 1 wherein provided that said repertory dialing number consists of n digits, at each inputting until the (n−1)th figure of said repertory dialing number, said controller generates said first signal, and at inputting of the n-th (i.e. last) figure of said repertory dialing number said controller makes comparison of said inputted number with repertory dialing numbers stored in said memory.

3. An automobile telephone apparatus in accordance with claim 1, wherein said signal generator includes a register for temporarily storing the value of said first and second signals and a frequency divider for dividing the frequency of a clock signal by the value stored in said register.

4. An automobile telephone apparatus in accordance with claim 1, wherein said sound generator produces audible tones of different frequencies in response to said sound signal.

* * * * *